L. BUSSE.
HORSESHOE.
APPLICATION FILED APR. 21, 1913.
1,122,472.
Patented Dec. 29, 1914.
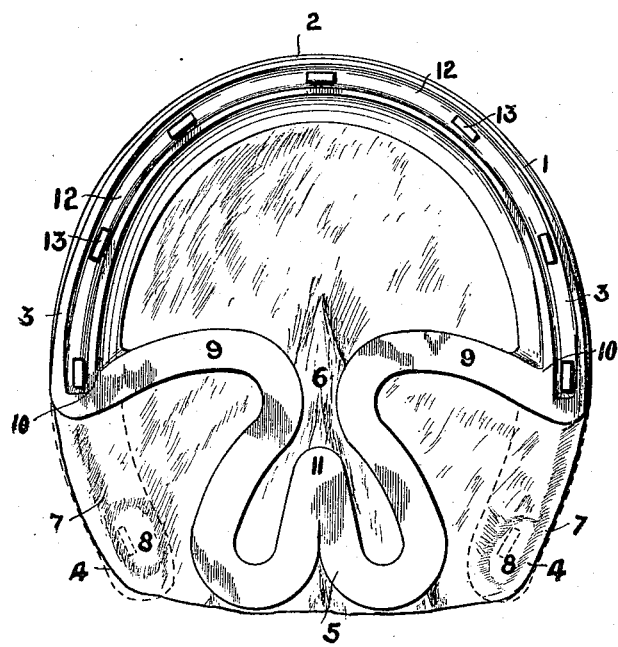
Witnesses
M. J. Whittaker
A. H. Smith
Inventor:
Leopold Busse
By his Attorney.
H. W. Waghorn

UNITED STATES PATENT OFFICE.

LEOPOLD BUSSE, OF JOHANNESBURG, TRANSVAAL, SOUTH AFRICA.

HORSESHOE.

1,122,472.  Specification of Letters Patent.  Patented Dec. 29, 1914.

Application filed April 21, 1913.  Serial No. 762,646.

*To all whom it may concern:*

Be it known that I, LEOPOLD BUSSE, a British subject, residing at 11 Bree street, Johannesburg, in the Province of the Transvaal, Union of South Africa, have invented certain new and useful Improvements in Horseshoes, of which the following is a specification.

The present invention relates to horse shoes.

The object of the invention is to provide a shoe which tends to prevent the occurrence of corns on the heels of the hoof and also relieves an animal already suffering from corns or tender heels.

A shoe according to this invention is illustrated in the accompanying drawing, which shows a bottom plan view of the shoe in position on the hoof.

The fore part 1 of the shoe is of the usual shape, i. e. as regards the toe 2 and substantially half of the quarters 3, 3. The remainder of the quarters and the heels 4, 4, indicated by dotted lines, are omitted and instead the rear part 5 of the shoe is bent or shaped to seat upon and cover the greater part of the frog 6 while avoiding the heels 7, 7, which is the part where corns 8 most frequently occur. Thus, each half 9, 9, of the rear portion may be somewhat the shape of a letter S joined to the front part at 10, 10, at an acute angle and uniting at 11 with the other half centrally over the frog 6.

Preferably the whole of the shoe is flat so that its entire under surface comes into contact with the ground. There is thus provided a wearing surface which may be made considerably larger in area than that obtained by the ordinary form of shoe, while at the same time the long length of edges afforded by the irregular shape of such wearing surface serves to lessen the tendency of the shoe to slip when in use.

The fore part 1 of the shoe may be fullered as at 12 and provided with nails 13 in the usual manner.

It will be understood that the likelihood of the growth of corns on the heels of the hoofs of animals is materially reduced if shoes of the form described are used when the animals are first shod.

In the case of a horse suffering from tender heels relief is obtained by the use of a shoe according to this invention, for since the whole of the shoe, including the part 5, is in one piece and perfectly rigid, the weight on the hoof that would otherwise come on the heels is supported by part 5 which in turn rests on the frog 6.

The construction of the shoe according to this invention does not interfere in any way with the usual fitting of the same to the hoof since the shape of part 5 allows the position of the quarters 3, 3, readily to be adjusted as desired.

When desired the quarters 3, 3, of the shoe may be extended almost to the heels 4, 4, before joining with part 5.

The objections to horse shoes of the usual shape, viz. their liability to injure the body of the horse when the latter is lying down with its fore legs bent under it, and also that they are liable to trip the horse should it overreach when running, are avoided by this invention owing to the absence of the heels of the shoe.

What I claim and desire to secure by Letters Patent is:—

A horse shoe wholly without heels, having a plane under surface adapted to make contact with the ground over substantially its whole area, and including a sinuously shaped portion comprising two substantially S-shaped portions, symmetrically disposed with relation to the hoof and seated upon and substantially covering the frog of the hoof, said sinuously shaped portion being rigid with the remainder of the shoe and providing a considerable edge length to prevent slipping of the horse and so shaped as to allow the shoe to be fitted to the hoof without necessitating stretching of the metal of said sinuously shaped portion.

In testimony whereof I affix my signature in the presence of two witnesses.

LEOPOLD BUSSE.

Witnesses:
 WESLEY E. JOHN,
 J. WARREN VENNING.

Copies of this patent may be obtained for five cents each, by addressing the "Commissioner of Patents, Washington, D. C."